Jan. 13, 1970     H. L. CHRISTY     3,489,027
LINEAR MANIPULATOR
Filed March 16, 1967     3 Sheets-Sheet 1
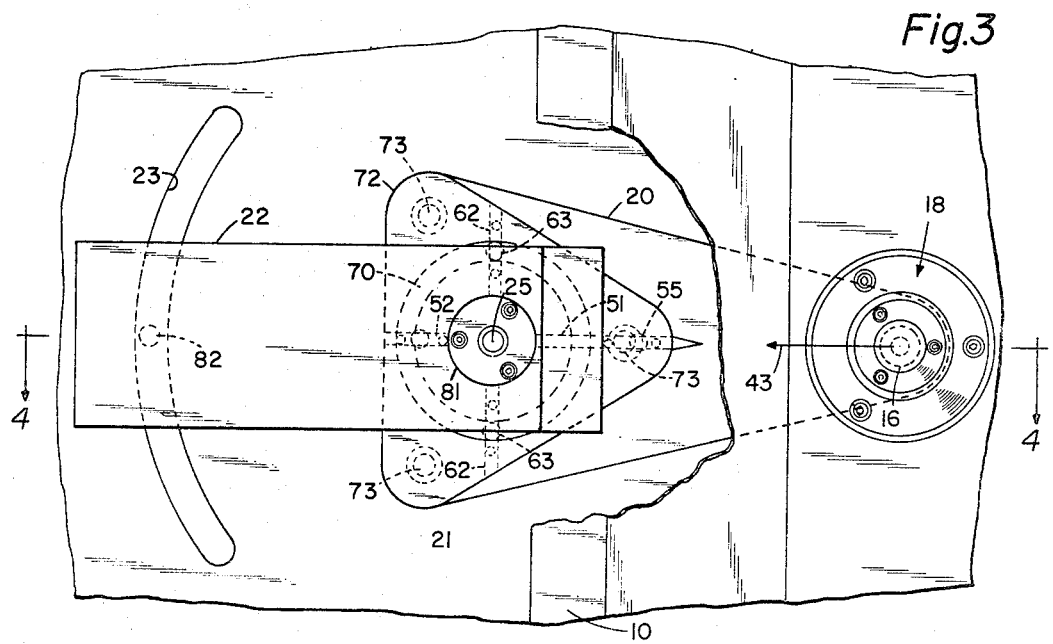
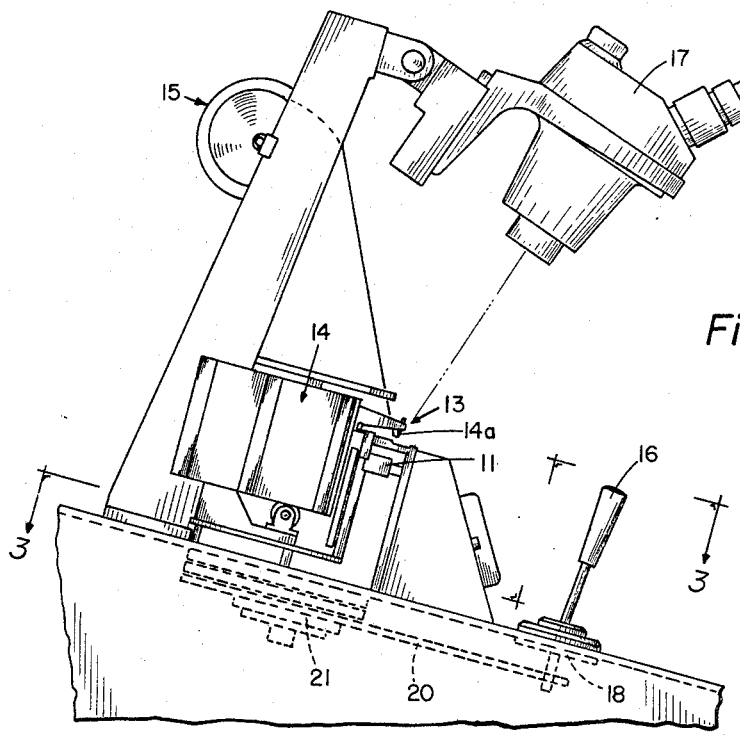
INVENTOR.
Harold L. Christy

United States Patent Office 3,489,027
Patented Jan. 13, 1970

3,489,027
LINEAR MANIPULATOR
Harold L. Christy, Phoenix, Ariz., assignor to Motorola, Inc., Franklin Park, Ill., a corporation of Illinois
Filed Mar. 16, 1967, Ser. No. 623,637
Int. Cl. G05g 9/06
U.S. Cl. 74—471          4 Claims

ABSTRACT OF THE DISCLOSURE

Motion is translated through a set of spherical bearings which in turn engage a non-rotatable plate for providing selective work positioning movements between a work table and a work tool. The spherical bearing is adjustable by a single adjustment for changing the ratio of all movements along a given plane of the work table with respect to the motion actuating mechanism. The work tool is also rotatable with respect to the work table.

BACKGROUND OF THE INVENTION

This invention relates to mechanical translation apparatus and more particularly to work positioning devices for use in manufacturing apparatus designed for microsized workpieces, such as semiconductor dies.

In manufacturing apparatus, the alignment of a work tool with a workpiece located on a work table usually consists of two steps. The first step includes positioning the workpiece in the general area of the work tool; i.e., placing the workpiece in the work station. This placement may be accomplished by several means including hand loading or by movement of a belt or other automatic or semiautomatic carrier holding a plurality of workpieces (semiconductor dies). After placing a die in the work station, the second step causes the work tool and workpiece to be moved within the work station from a non-working to a working position. In semiconductor manufacture this latter positioning may consist of movements of only thousands of an inch, such as moving a bonding tool over a wire bonding or land area on a semiconductor die. After the work tool and workpiece are in a working position, the tool is subjected to work movements, such as moving downwardly to engage the die for bonding a wire thereto and automatically cutting such wire after the bonding operation. After the bonding operation the tape or other carrier may be moved to bring the next die into the work station whereupon the cycle is repeated.

To reduce manufacturing costs, it is desired that the second step of positioning the work tool and the workpiece into a working position must be performed accurately and quickly. Some previous manipulators for providing such relative positioning movements between the work tool and the workpiece had a control or actuating handle in which when moved in the first direction caused a relative movement between the tool and the workpiece in an opposite direction. In training an operator to use such a device, it was found that a certain amount of concentration was required to keep this opposite motion in mind. In other words, it appears to result in an unnatural reaction by an operator. Further, it was found in prior art manipulators that the relative movements imparted between the work tool and the workpiece were not always linear, that is, the relative movements between the tool and the workpiece would not always accurately correspond to the movements of the actuating handle. For example, if a circle were drawn by the control handle an ellipse would be traced by the relative movements between the work tool and the workpiece. An operator can compensate for such non-linearities. However, when automating a manufacturing operation it is difficult to accurately program a numerical machine for controlling a machine tool to compensate for such non-linearities.

SUMMARY OF THE INVENTION

It is an object of this invention to provide a smoothly operating simple manipulator that operates without blacklash.

It is another object of this invention to provide a manipulator wherein the relative movements between a work tool means and a workpiece means have a linear relationship and wherein the direction of movement of the means being moved is in the same direction as the direction of movement of an actuator.

It is another object of this invention to provide a manipulator wherein there is one adjustment for changing the ratio of movements in all positioning directions.

It is a still further object of this invention to provide an improved spherical bearing assembly for use in a mechanical translation apparatus.

Apparatus incorporating the present invention include the features of having a spherical bearing, i.e., a ball and socket joint, with a control handle or actuator thereon. A smaller ball is rotatably disposed inside the first spherical bearing and has a connecting rod attached thereto which extends through a second spherical bearing axially displaced from the first. The distance between the two spherical bearings determines the mechanical advantage of the manipulator apparatus. At the remote end of the connecting rod there is a third spherical bearing mounted in a movable mechanical translation sub-plate on which the work tool or workpiece is attached. As the handle is moved the sub-plate moves in the same direction as the handle diminished by a ratio determined by the spherical bearing and which serves to provide relative positioning movements between a work tool and a workpiece.

The sub-plate is kept from rotating (non-rotatable about its own axis) by a bearing assembly which has a set of perpendicular bearing grooves. By keeping the sub-plate non-rotatable, as above described, non-linearities are kept from being introduced into the manipulator. The single adjustment provided in the spherical bearing assembly prevents non-linearities from being introduced in the X and Y directions when the ratio of movements between the relative movements and the actuating movements are changed.

To provide additional relative positioning movements to that supplied by the above-described apparatus, the work tool and the work table may be made rotatable with respect to each other.

THE DRAWING

FIG. 1 is a side elevational view of a machine incorporating the teachings of the present invention.

FIG. 3 is a schematized partial plan view of the FIG. 1 machine with some portions cut away for illustrating the invention.

DESCRIPTION OF THE ILLUSTRATIVE EMBODIMENT

Figure 2:
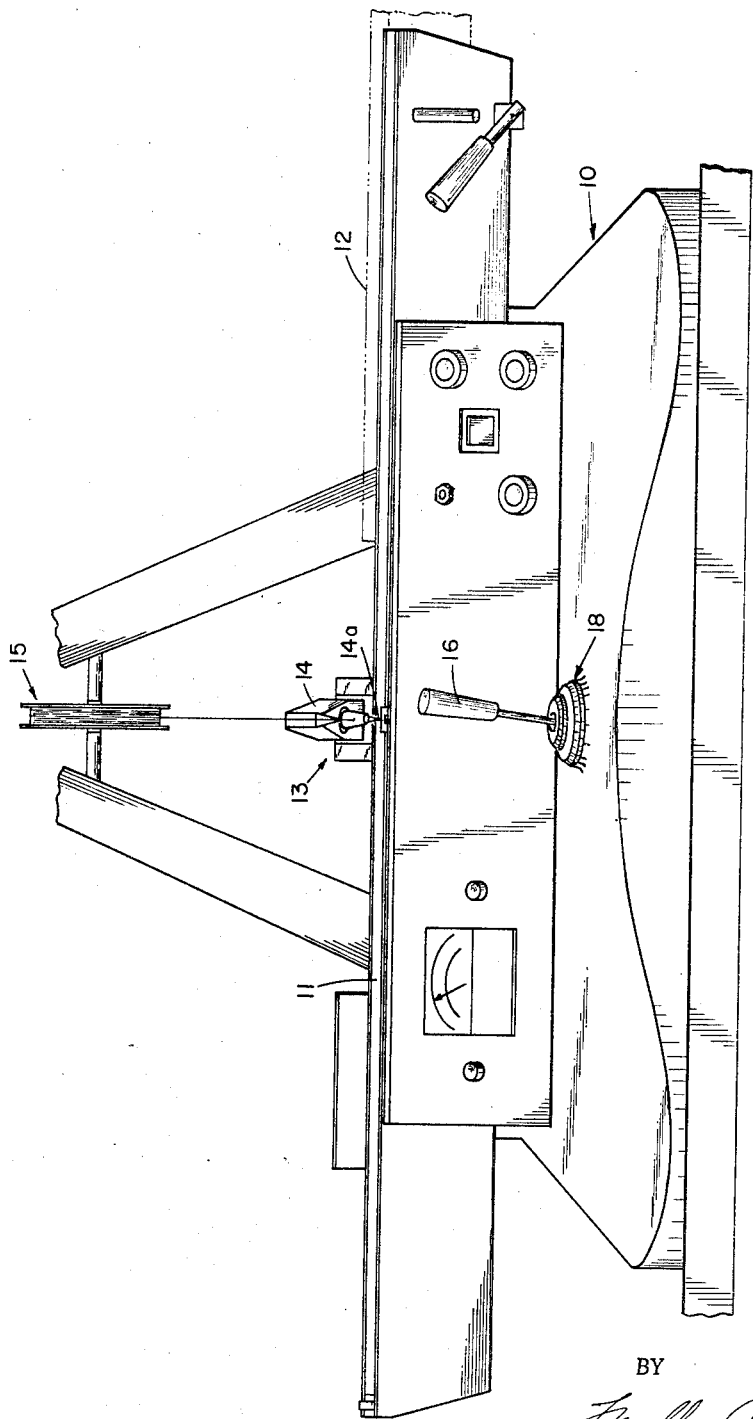
FIG. 2 is a front elevational view of the FIG. 1 machine.

Referring now to FIGS. 1 through 4, there is shown a machine tool in which the subject matter of the present invention may be incorporated. The machine has a frame 10 on which a work table means 11 is secured. Work table means 11 includes a workpiece carrier 12 which is selectively movable therein for successively bringing workpieces to work station 13, the details of which are not important to the practice of the present invention. It suffices to say that the carrier 12 is operative to bring the workpiece, such as a semiconductor die, into the general vicinity of a work tool 14, which area is termed a work station. The work tool includes wire feeding mechanism 15 which automatically feeds wire to the work station for bonding to a land area in a known manner by needle 14a. After carrier 12 has positioned a workpiece in work station 13, an operator (not shown) moves actuating handle 16 for providing work positioning micromovements to work tool 14. Since the dimensions of a semiconductor die are extremely small, the operator views the work station 13 through microscope 17.

In positioning tool 14, handle 16 drives a spherical bearing assembly 18 in which the direction of the handle movement is reproduced at the remote end portion of connecting shaft 19 for moving translation sub-plate 20 in the same direction as handle 16 is moved. Sub-plate 20 movements are of much less extent than handle 16 movements. As will be later fully described, spherical bearing assembly 18 provides a large mechanical advantage between handle 16 and the movements of tool 14.

Translation sub-plate 20 is made non-rotatable by bearing assembly 21 which also serves to translate movements of sub-plate 20 to work tool support plate 22. Support plate 22 is movably mounted on frame 10 as will be later described in detail. Bearing assembly 21 also provides for relative rotational movement between support plate 22 and the translation sub-plate 20 and frame 10. Arcuate slot 23 is provided in frame 10 for permitting rotation of plate 22 to provide certain work repositioning movements of tool 14, as will become apparent. As shown, drive shaft 24 is rotatably supported in bearing assembly 21 for translating rotational drive power from a prime mover (not shown) to work tool 14.

When handle 16 is moved in any direction, sub-plate 20 moves in the same direction along a plane parallel to the frame 10 extent without rotating about its own axis to impart linear movements to tool support plate 22 which are in a linear relationship to the handle 16 movements. Since movements of tool 14 with respect to the workpiece are in the same relative direction as the movements of handle 16, operators have found it easy to utilize machines incorporating the present invention. In wire bonding to a semiconductor die, especially one forming an integrated circuit, several land or wire bonding areas are usually formed on the die. In a usual operation of the illustrated machine, the operator manipulates handle 16 to position tool 14 over a selected one of such land areas. A foot pedal (not shown) is then depressed and the tool 14 performs a wire bonding operation on that particular land area. When it is desired to bond another wire to a different land area on the same semiconductor die, plate 22 can be rotated for moving tool 14 over the adjacent land area and a bonding operation then can be automatically or semi-automatically initiated. Bonding needle 14a is closely adjacent to the axis of rotation 25 of work tool 14 support plate 22. Since needle 14a has a short radius of rotation (FIG. 3), large rotational movements of tool 14 result in short movements of needle 14a.

Figure 4:
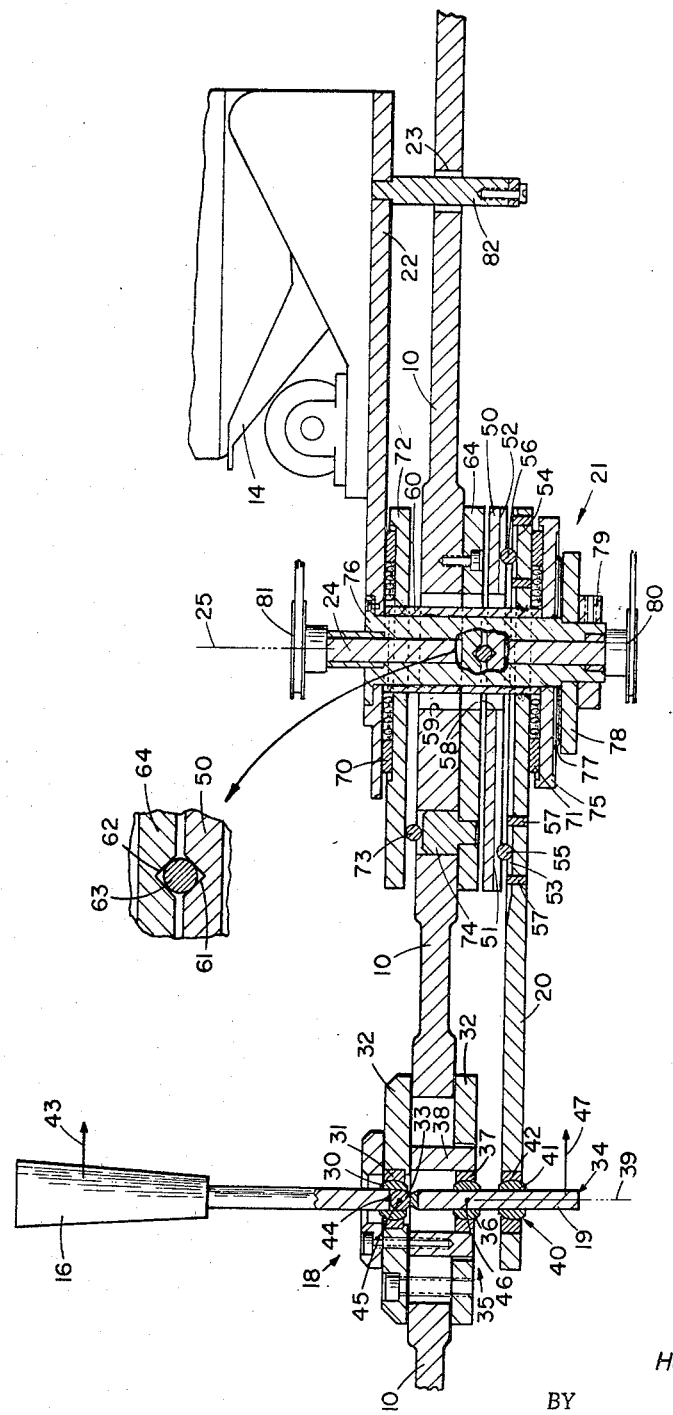
FIG. 4 is a sectional view of a portion of the FIG. 1 machine illustrating the spherical bearing assembly and other portions of the manipulator apparatus as taken along line 4—4 in the direction of the arrows of FIG. 3.

Referring next to FIG. 4 the details of the spherical bearing assembly 18 are described. Assembly 18 consists of a first large spherical ball 30 rigidly attached to handle 16 and pivotally mounted in bushing 31. The bushing 31 is securely attached to support ring assembly 32 on frame 10, as shown. A small sphere or ball 33 is pivotally disposed inside large ball 30, as shown, and is fixedly secured to connecting rod or shaft 34. Rod 34 slidably extends through a second spherical bearing 35 which includes a second large ball 36 pivotally mounted in bushing 37. Large ball 36 is apertured for axially slidably receiving rod 34. Bushing 37 is secured to tubular sleeve 38 for example, by a press fit, to prevent movement thereof during normal operation. As shown, sleeve 38 is supported by ring assembly 32 on frame 10. The location of bushing 37 along axis 39 may be changed to adjust the ratio of movements between work tool 14 and handle 16. Remote end portion 19 of rod 34 extends through spherical bearing 40 which consists of an apertured ball 41 pivotally mounted in bushing 42 which is secured to non-rotating sub-plate 20 as by a press fit.

When handle 16 is moved in the direction of arrow 43, for example, first large ball 30 pivots clockwise about its center of pivoting 44 located on bearing axis 39. Small ball 33 is eccentrically disposed in ball 30 and has its own center of pivoting 45. As first large ball 30 pivots clockwise, ball 36 and rod 34 pivot counter-clockwise in bearing 37 around its center of pivoting 46 to move end portion 19 in the direction of arrow 47, the same direction as handle 16 is moved. Rod 34 axially slides a short distance in bearings 35 and 40 during such motion. It is to be understood that the above described movements will be the same for all directions in a plane perpendicular to FIG. 4 section.

As end portion 19 is moved by handle 16, pivoting moments are imparted to sub-plate 20 through bearing 40. If sub-plate 20 pivoted on its own axes non-linearities in the ratios of movement between handle 16 and tool 14 could be introduced. Therefore, sub-plate 20 is made non-rotatable but with freedom of movements in all directions along the plane in which it lies.

The action of bearing assembly 21 of FIG. 4 to keep sub-plate 20 non-rotatable is now described. By non-rotation is meant that sub-plate 20 does not rotate about any of its own axes even though it may be subjected to circular movements by actuating handle 16. In other words, all points of sub-plate 20 in any instant move in the same direction and the same distance. Such non-rotation is provided by a set of perpendicular groove bearings (51, 52, 61, 62, 63, 53, 54, 55, 56) in bearing assembly 21.

Freedom of movement in the first direction parallel to the section of FIG. 4 is provided by the co-action of longitudinal bearings between floating plate 50 and translation sub-plate 20. Opposed-opening longitudinally-spaced apart grooves 51, 52, 53 and 54 on the respective plates form the rectilinear bearing races. Ball bearings 55 and 56 are rotatably retained within the longitudinal grooves by stop pins 57. Ball bearings are preferred because of their low co-efficient of friction. It is seen that as handle 16 is moved in the direction of arrow 43, plate 20 moves in the direction of arrow 47 as permitted by the just described longitudinal bearings. To permit such movement, plate 50 has large aperture 58 while frame 10 has large aperture 59 accommodating corresponding movements of tubular sleeve 60 therein. Sleeve 60 is press fit into sub-plate 20 and tool stabilizing plate 72.

To permit movement of sub-plate 20 and tool 14 perpendicular to the section of FIG. 4, a pair of grooves 61 (FIGS. 3 and 4) are provided in the upper side of plate 50 extending transverse to longitudinal grooves 51 and 52. A stationary plate 64 is rigidly attached to frame 10 and has downwardly opening grooves matching grooves 61 and rollingly retains ball bearings 63. Plate 20 moves longitudinally parallel to the section of FIG. 4 with respect to plate 50, whereas both plates 50 and 20 simultaneously move perpendicular to the FIG. 3 section line. Therefore, complete freedom of motion in a plane parallel to plate 20 is permitted with plate 20 being inhibited from rotation about its own axis by the cooperation of the transversely extending grooves.

For good accuracy, precise machining techniques should be followed in fabricating bearing assemblies 18 and 21. It is now seen that motions imparted to handle 16 are accurately imparted to tool 14 rigidly mounted on plate 22 with respect to frame 10.

The mechanical advantage and therefore the ratio of movements of handle 16 with respect to the movements of tool 14 is determined by the axial adjustment of spherical bearing 35 (FIG. 4) within tubular sleeve 38 of assembly 18. Assume for purposes of discussion that bearing assembly 40 in plate 20 is fixed relative to frame 10 and therefore to the first spherical bearing including large ball 30. The ratio of movements is then determined by the ratio of distances between the bearing centers of rotation of the first and second spherical bearings of assembly 18. This ratio is the distance between centers of rotation 44–45 as related to the distance between centers of rotation 45–46. The greater the distance between centers 45 and 46, assuming other dimensions are constant, the shorter the distance tool 14 will move for a given movement of actuator handle 16. This ratio is adjusted merely by changing the axial position of bushing 37 within sleeve 38. In embodiments wherein bushing 37 is press fitted into sleeve 38, the position of bushing 37 is changed by disassembling the spherical bearing assembly and forcing the bushing axially along the sleeve. It is apparent that such adjustment will adjust the ratio in all directions thereby eliminating any non-linearities from entering into the motion translation with respect to perpendicular directions of movement.

In addition to the above described work positioning apparatus it is desired that tool 14 may be made rotatable with respect to work table 11. Such rotational movement facilitates wire bonding to a plurality of bonding or land areas on a single semiconductor die. To this end, radial bearings 70 and 71 are provided in bearing assembly 21 (FIGS. 3 and 4). Radial bearing 70 is an anti-friction bearing disposed between the lower side of tool support plate 22 and a race in the upper portion of tool stabilizing plate 72. The sleeve 60 is press fit into stabilizing plate 72. For permitting movement of stabilizing plate 72 with respect to frame 10, three ball bearings 73 are disposed between plate 72 and bearing inserts 74 of frame 10. The three bearings form a tripod support of stabilizing plate 72 for keeping tool 14 in a plane parallel with the plane of frame 10. Since radial bearing 70 permits rotation of tool support plate 22 about axis 25 with respect to sleeve 60, rotation is permitted with respect to frame 10. Rotational freedom is also required with respect to plate 20 requiring radial bearing 71 as disposed between bearing retainer plate 75 and plate 20 (FIG. 4). Plate 75 has tubular bearing 76 press fit thereinto which is rotatably disposed in sleeve 60, as shown. Radial bearing 71 therefore permits rotational movement of sleeve 76 in sleeve 60 on plate 20 and therefore rotation of tool 14 with respect to work table 11.

Bearing assembly 21 is held together by the pressure of spring 77 as axially urged by retainer plate 78 and threaded nut 79 which screws on tubular bearing 76 tending to pull retainer plate 78 and plate 22 together. Bearing assembly 21 is completed by drive shaft 24 being rotatably disposed in tubular bearing 76 for translating rotational power from a prime mover (not shown) driving pulley 80 to driven pulley 81 to tool 14. The mechanisms in tool 14 utilizing such power are not shown and not pertinent to the present invention.

The rotation of tool 14 with respect to the workpiece on table 11 is provided by a drive mechanism (not shown) acting upon depending drive pin 82 extending through circumferential groove 23.

What is claimed is:

1. A spherical bearing assembly having an axis, including the combination of,
    a tubular elongated support means extending along the axis,
    a first spherical bearing mounted adjacent one end of said tubular support means and having a large pivotable sphere with a cavity opening axially inwardly to said tubular support means and a smaller sphere pivotally retained in said cavity,
    a second spherical bearing pivotally mounted in said tubular support means and axially displaced from said first spherical bearing and having an aperture extending generally along said axis and along a diameter of said second spherical bearing,
    a connecting rod rigidly secured to said small sphere in said first spherical bearing and axially movably extending through said aperture of said second spherical bearing and having an end portion extending outwardly of said tubular support means axially opposite said first spherical bearing, and
    said large sphere and said small sphere each having a center of pivoting displaced one from the other.

2. A micromanipulator, for providing relative positioning movements between a work table means and a work tool means mounted on a common support frame, said frame having an elongated portion, the combination comprising:
    a tubular elonagted support means extending along an axis;
    a first spherical bearing mounted adjacent one end of said tubular support means and having a large pivotal sphere with a cavity opening axially inwardly to said tubular support means and a smaller sphere pivotally retained in said cavity;
    a second spherical bearing pivotally mounted in said tubular support means and axially displaced from said first spherical bearing and having an aperture extending generally along said axis and along the diameter of said second spherical bearing;
    a connecting rod rigidly secured to said small sphere in said first spherical bearing and axially movably extending through said aperture of said second spherical bearing and having an end portion extending outwardly of said tubular support means axially opposite said first spherical bearing, said large sphere and said small sphere each having a center of pivoting displaced one from the other;
    a translation plate having a spherical bearing in one portion thereof for movably receiving said rod end portion and receiving actuating movements therefrom,
    bearing means movably supporting said translation plate for movements along one plane and restricting the movements thereof in said one plane to prevent rotation of said plate about any axis perpendicular thereto such that all points in said plate move parallel to one another for all movements in said one plane; said translation plate extending along the elongated portion of said frame and said translation plate bearing means being supported on said frame, and said translation plate being operatively connected to one of the work means for providing movements with respect to the other of said work means.

3. The micromanipulator of claim 1 wherein said translation plate support bearing means comprises,
    a movable floating plate having first and second transversely extending bearing means which respectively permit rectilinear motion in transverse directions,
    said first transversely extending bearing means engaging said frame for permitting motion of said floating plate with respect to said frame along a first direction,
    said second transversely extending bearing means engaging said translation plate such that the cooperative relationship of said transversely extending bearings substantially prevents rotational movement thereof with respect to any motion of said second spherical bearing.

4. The micromanipulator of claim 3 wherein said tubular support means extends through said frame, and further including actuating means on said large pivotal sphere on one side of the frame with said translation plate disposed along another side of the frame,
    said plate support means mounted on said another side of the frame,
    the frame having an aperture adjacent said support means, a tubular sleeve rigidly secured to said translation plate and having a smaller diameter than said frame aperture and extending through said aperture to said one side of the frame, a work means stabilizing plate movably mounted on said one side of the frame and rigidly secured to said sleeve for motion parallel to the frame, and said one work means supported by said stabilizing plate.

References Cited

UNITED STATES PATENTS

| | | |
|---|---|---|
| 736,475 | 8/1903 | Barr. |
| 1,449,148 | 3/1923 | Gehrig _____ 74—503 |
| 1,829,037 | 10/1931 | Bobroff. |
| 2,610,520 | 9/1952 | Snow _____ 74—471 |
| 2,847,873 | 8/1958 | Woodson _____ 74—471 X |
| 3,103,137 | 9/1963 | Charschan. |
| 3,188,879 | 6/1965 | Conley _____ 74—471 |
| 3,204,584 | 9/1965 | Mladjan. |
| 944,158 | 12/1909 | Smith _____ 312—250 |
| 3,179,260 | 4/1965 | Ferlen _____ 74—502 |

FRED C. MATTERN, Jr., Primary Examiner

C. F. GREEN, Assistant Examiner

U.S. Cl. X.R.

228—3